United States Patent [19]
Gretener et al.

[11] Patent Number: 6,129,199
[45] Date of Patent: *Oct. 10, 2000

[54] METHOD AND DEVICE FOR CHANNELING PARCELED GOODS

[75] Inventors: Urs Gretener, Ennetturgi; Bear Heinz, Sils i.D.; Ruedi Rykart, Schmidrued, all of Switzerland

[73] Assignees: Siemens Schweiz AG, Zurich; Grapha-Holdings AG, Hergiswil, both of Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/817,827

[22] PCT Filed: Sep. 5, 1996

[86] PCT No.: PCT/CH96/00305

§ 371 Date: Jun. 26, 1997

§ 102(e) Date: Jun. 26, 1997

[87] PCT Pub. No.: WO97/09256

PCT Pub. Date: Mar. 13, 1997

[30] Foreign Application Priority Data

Sep. 8, 1995 [CH] Switzerland ......... 2560/95-2

[51] Int. Cl.[7] ................................. B65G 47/46
[52] U.S. Cl. ............. 198/357; 198/370.04; 198/502.2
[58] Field of Search ............ 198/370.3–370.6, 198/357, 460.1, 502.2

[56] References Cited

U.S. PATENT DOCUMENTS 3,747,781 7/1973 Daigle et al. ............ 198/357
3,817,368 6/1974 Wentz et al. ............ 198/357

(List continued on next page.)

FOREIGN PATENT DOCUMENTS 0305755 3/1989 European Pat. Off. .
0343613 8/1992 European Pat. Off. .

(List continued on next page.)

*Primary Examiner*—Joseph E. Valenza
*Attorney, Agent, or Firm*—Greenblum & Bernstein, P.L.C.

[57] ABSTRACT

Process and apparatus for controlling the channeling of parceled goods to be delivered via a delivery conveyor, which includes at least one buffer conveyor, a call-up conveyor, and a channeling conveyor, to free locations on an acceptance conveyor running at a constant speed. The acceptance conveyor and the delivery conveyor are arranged to encompass an angle α, and the delivery conveyor is provided with a parcel measuring device. The process includes measuring a length of a parcel to be channeled, determining a length of time t2 utilized in measuring the length of the parcel, and determining a momentary parcel speed; a speed of the channeling conveyor to which the parcel will be transferred; a distance on the call-up conveyor on which acceleration of the parcel occurs prior to a transfer of the parcel to the channeling conveyor; and a position of a next free space on the acceptance conveyor. The process also includes synchronizing movement of the parcel to the next free space by one of (a) accelerating and decelerating and (b) decelerating and accelerating the parcel on the call-up conveyor at a constant acceleration a, and without intermediate stopping of the call-up conveyor, transferring the parcel from the call-up conveyor to the channeling conveyor, and synchronously transferring the parcel to the next free space on the acceptance conveyor. The apparatus includes a measuring device to measure a length of a parcel to be transferred from the delivery conveyor to the acceptance conveyor, wherein the measurement of the length occurs in a time t2, a control device provided for determining a momentary speed of parcel; a speed of the channeling conveyor to which the parcel will be transferred; a distance on the call-up conveyor on which acceleration of the parcel occurs prior to a transfer to the channeling conveyor; and a position of a next empty space on the acceptance conveyor. The control device also is provided to adjust one of (a) an acceleration and deceleration and (b) a deceleration and acceleration of the parcel on the call-up conveyor, without intermediate stopping of the call-up conveyor, to synchronize the movement of the parcel to the next empty space on the acceptance conveyor.

29 Claims, 2 Drawing Sheets

U.S. PATENT DOCUMENTS

| | | | |
|---|---|---|---|
| 4,915,209 | 4/1990 | Canziani | 198/357 |
| 5,267,638 | 12/1993 | Doane . | |
| 5,341,916 | 8/1994 | Doane et al. . | |
| 5,860,504 | 1/1999 | Lazzarotti | 198/357 |

FOREIGN PATENT DOCUMENTS

| | | |
|---|---|---|
| 0527542 | 2/1993 | European Pat. Off. . |
| 0577021 | 1/1994 | European Pat. Off. . |
| 0619248 | 10/1994 | European Pat. Off. . |

METHOD AND DEVICE FOR CHANNELING PARCELED GOODS

CROSS-REFERENCE TO RELATED APPLICATIONS

The present application is a U.S. National Stage of International Application No. PCT/CH96/00305 filed Sep. 5, 1996 and claims priority under 35 U.S.C. § 119 of Swiss Patent Application No. 2560/95-2, filed on Sep. 8, 1995.

BACKGROUND OF THE INVENTION

1. Field of the Invention

The present invention relates to a process and apparatus for controlling the channeling of parceled goods to be delivered via a delivery conveyor, which includes at least one buffer conveyor, a call-up conveyor, and a channeling conveyor, to free locations on an acceptance conveyor running at a constant speed. The acceptance conveyor and the delivery conveyor are arranged to encompass an angle α, and the delivery conveyor is provided with a parcel measuring device.

2. Discussion of Background Information

For sorting parceled goods, e.g., for parcel shipments in postal operations, sorting units are used which, for example, are known from EP A 0 305 755, EP A 0 343 613 or EP A 0 619 248. Sorting units of this type, which allow an almost fully automated distribution of incoming parceled goods to various users, are provided with at least with one acceptance conveyor on which the parceled goods to be distributed are placed of at least one channeling device which has at least one delivery conveyor. The parceled goods provided to the target addresses are conveyed on the acceptance conveyor to a channeling device consistent with the target address of the parceled goods. By channeling the parceled goods to its destination, the conveyor is vacated for reloading with parceled goods by means of the channeling device. Due to the steady increase in the flow of parceled goods in the cargo area and the high investment costs involved in sorting facilities, efforts are made to achieve a high processing volume of parceled goods in these installations. Achieving a high processing volume of parceled goods is primarily contingent upon a exact positioning of individual parcels on the acceptance conveyor. If the parceled goods are not placed precisely on the acceptance conveyor by the channeling device, this can result in malfunctions which always must be remedied by manual intervention. The devices used for channeling parceled goods of varying size, shape and weight also must meet special requirements, so that the parceled goods are positioned exactly on the acceptance conveyor. This applies, in particular, when operating tipping tray installations in which the parceled goods to be channeled are placed on tipping trays. EP A 0 305 755 already determined that parceled goods, which are displaced with respect to the center line of the delivery conveyor, cannot be positioned precisely without correcting the tipping tray. This problem can be solved by various measures. As a precise placing of the parceled goods on the center line of the delivery conveyor, which would solve the problem, cannot be achieved without encountering other disadvantages, in the solutions offered by EP A 0 305 755, EP A 0 343 613 or EP A 0 619 248, the time, at which a parcel reaches the acceptance conveyor, is selected as a function of its position which is relative to the center line of the delivery conveyor. In EP A 0 305 755, a counting device is controlled by two light barriers intersecting at a specific angle, which, as a function of the position of the parceled goods, transmits the counting result as the parceled goods pass through the light barrier, as a result of which is activated a proportional delay of the otherwise static channeling process. In EP A 0 343 613, instead of delaying the start of the channeling process, this delay is achieved by using two different speeds ($v_o/\sqrt{2}$) or ($v_o*\sqrt{2}$) which temporally are set as a function of the position of the parceled goods along a light barrier which is directed parallel to the acceptance conveyor or as a function of the position of the parceled goods relative to the center line of the delivery conveyor. Instead of a starting time depending on the position of the parcel, in the second example, the time for switching between varying speeds is selected as a function of the position of the parcel, in order to achieve the required delay. The second speed ($v_o*\sqrt{2}$) is the speed with which parceled goods are channeled on the acceptance conveyor (channeling speed). The first speed ($v_o/\sqrt{2}$), which is selected to delay the parceled goods, therefore, always is lower than the channeling speed. With the known devices from EP A 0 305 755 and EP A 0 343 613, a delay is effected which is selected as a function of the lateral position of the parcel located on the delivery conveyor. This delay, which is effected independent from the position of the tipping trays provided on the acceptance conveyor, therefore, serves exclusively to balance the lateral displacement of parceled goods on the delivery conveyor.

In EP A 0 619 248, prior to accelerating the light barrier, which runs vertically along the acceptance conveyor, the parceled goods are stopped until the channeling process is initiated. The resulting displacement of the parceled goods in the direction of conveyance as a function of the lateral displacement on the delivery conveyor effects a uniform acceleration of each parcel at the acceptance conveyor.

The devices according to EP A2 0 305 755 (see page 5, lines 37–42), EP A2 0 343 613 (column 4, lines 41–57) and EP A1 0 619 248 (column 4, lines 13–25) further have in common that the parceled goods are stopped for the time during which the host computer determines the distance to the next empty tipping tray. This causes interruptions within the channeling processes which clearly reduce the processing speed of parceled goods. Delays also result from the fact that after stopping the parceled goods must accelerate to regain their channeling speed. As a result, it may happen that because of the stopping and acceleration process, an empty tipping tray may be missed. A stopping process may under certain circumstances only be avoided if an empty tipping tray is located at a suitable distance from the transfer point.

SUMMARY OF THE INVENTION

The present invention provides a process and apparatus in which parceled goods can be channeled in basic cycles from a delivery conveyor to an acceptance conveyor. In particular, idle time is to be avoided when channeling parceled goods, unless empty containers or tipping trays already move synchronously on the acceptance conveyor.

The present invention provides a process that includes measuring a length of a parcel to be channeled, determining a length of time t2 utilized in measuring the length of the parcel, and determining a momentary parcel speed; a speed of the channeling conveyor to which the parcel will be transferred; a distance on the call-up conveyor on which acceleration of the parcel occurs prior to a transfer of the parcel to the channeling conveyor; and a position of a next free space on the acceptance conveyor. The process also includes synchronizing movement of the parcel to the next free space by one of (a) accelerating and decelerating and (b) decelerating and accelerating the parcel on the call-up conveyor at a constant acceleration a, and without intermediate stopping of the call-up conveyor, transferring the parcel from the call-up conveyor to the channeling conveyor, and synchronously transferring the parcel to the next free space on the acceptance conveyor.

The present invention also provides an apparatus that includes a measuring device to measure a length of a parcel to be transferred from the delivery conveyor to the acceptance conveyor, wherein the measurement of the length occurs in a time t2, a control device provided for determining a momentary speed of parcel; a speed of the channeling conveyor to which the parcel will be transferred; a distance on the call-up conveyor on which acceleration of the parcel occurs prior to a transfer to the channeling conveyor; and a position of a next empty space on the acceptance conveyor. The control device also is provided to adjust one of (a) an acceleration and deceleration and (b) a deceleration and acceleration of the parcel on the call-up conveyor, without intermediate stopping of the call-up conveyor, to synchronize the movement of the parcel to the next empty space on the acceptance conveyor.

The inventive process and the device enable a reduction in interfering idle times, while channeling parceled goods of similar or different sizes. The idle times reducing the processing of parceled goods can thus occur only if the acceptance conveyor does not make available empty tipping trays over a long period. Further, a targeted acceleration of the channeling processing, which is contingent upon the position of the tipping trays to be loaded and the size of the parceled goods, is achieved which enables synchronization of parceled goods with empty tipping trays with respect to the transfer time, which could no longer be reached with the known method and thus would continue to be conveyed unused on the acceptance conveyor. Instead of the static channeling process, a process is implemented which dynamically balances the parceled goods and the position of the tipping trays, which allows channeling the parceled goods within the shortest possible time. In contrast to known devices, the device provided according the inventive method can be implemented practically without additional expenditure.

BRIEF DESCRIPTION OF THE DRAWINGS

The invention is explained in detail by means of a drawing. Of the drawings.

DETAILED DESCRIPTION OF THE PRESENT INVENTION

Figure 1:
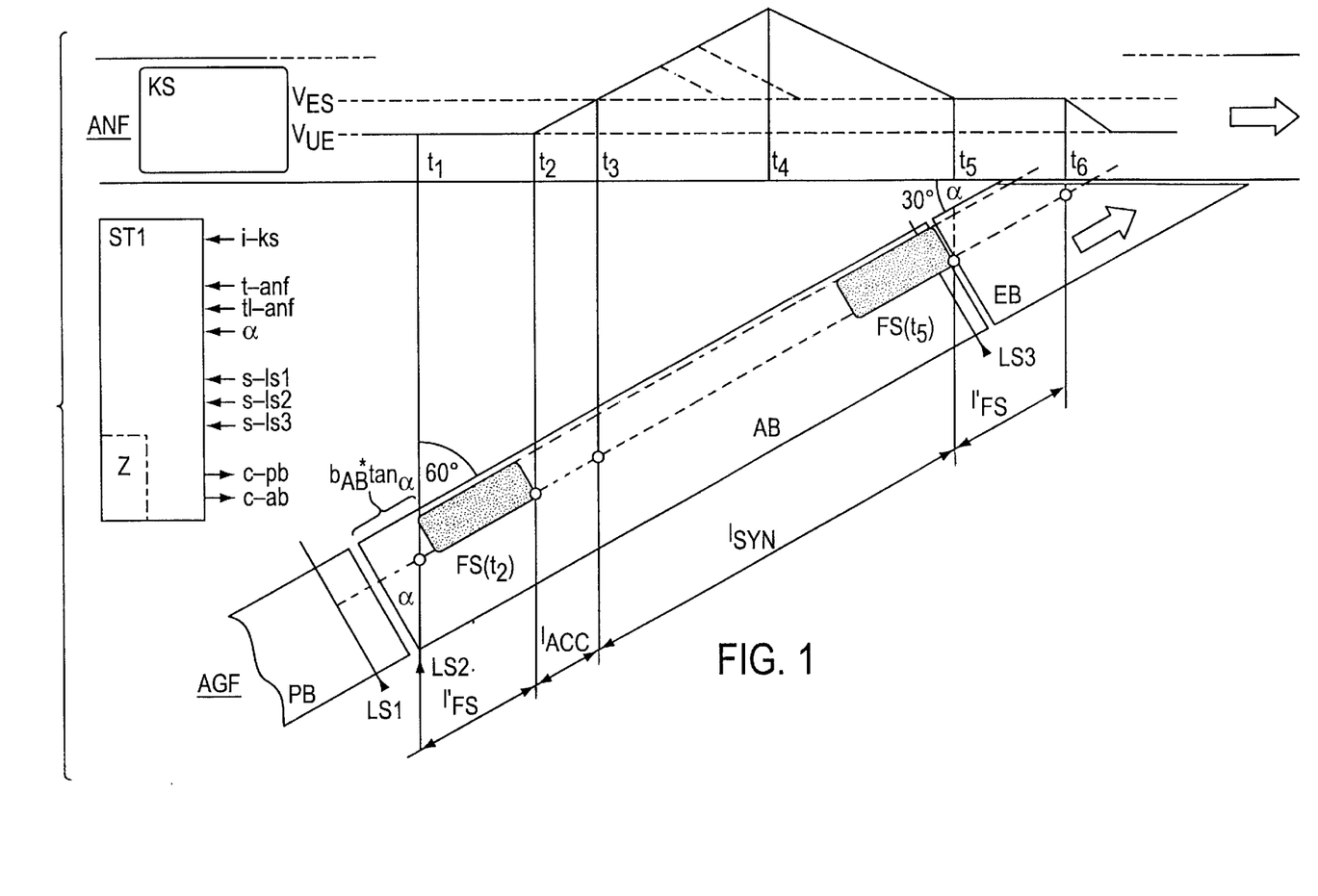
FIG. 1 shows a central acceptance conveyor on which parceled goods are channeled via a delivery conveyor provided with a call-up conveyor.

FIG. 1 shows a delivery conveyor AGF comprised of a buffer conveyor PB, a call-up conveyor AB and a channeling conveyor EB, through which parceled goods FS are channeled on an acceptance conveyor ANF. Also shown are a channeling process for a parcel FS, which is controlled by a control unit ST1, and the speed variation with which the parcel FS is conveyed through the delivery conveyor AGF. Following the channeling process, the parcel FS is to be placed precisely in a single or multiple container or tipping tray which is conveyed by the acceptance conveyor ANF. If the parcel FS is made available in due time, it will preferably be positioned at the front edge of the tipping tray (front edge of the parcel FS at the front edge of the tipping tray KS), in order to empty the delivery conveyor AGF as soon as possible and to ready said container for channeling a further parcel FS. However, if the parcel is passed on relatively late by the buffer conveyer PB to the call-up conveyor AB, the positioning preferably takes place at the rear edge of the tipping tray (rear edge of the parcel FS at the rear edge of the tipping tray KS). In order to simplify the control processes, the parceled goods FS can be respectively positioned in the center of the tipping tray KS. The channeling processes with corresponding positioning of the parceled goods FS, can be performed in that the parceled goods FS are readied in the area of the call-up conveyor AB as is the case in the prior art of a stopping line, and they can be accelerated to the channeling speed after the tipping tray KS has appeared at a specific point. This will result in idle times which will be avoided with the inventive channeling method.

Figure 2:
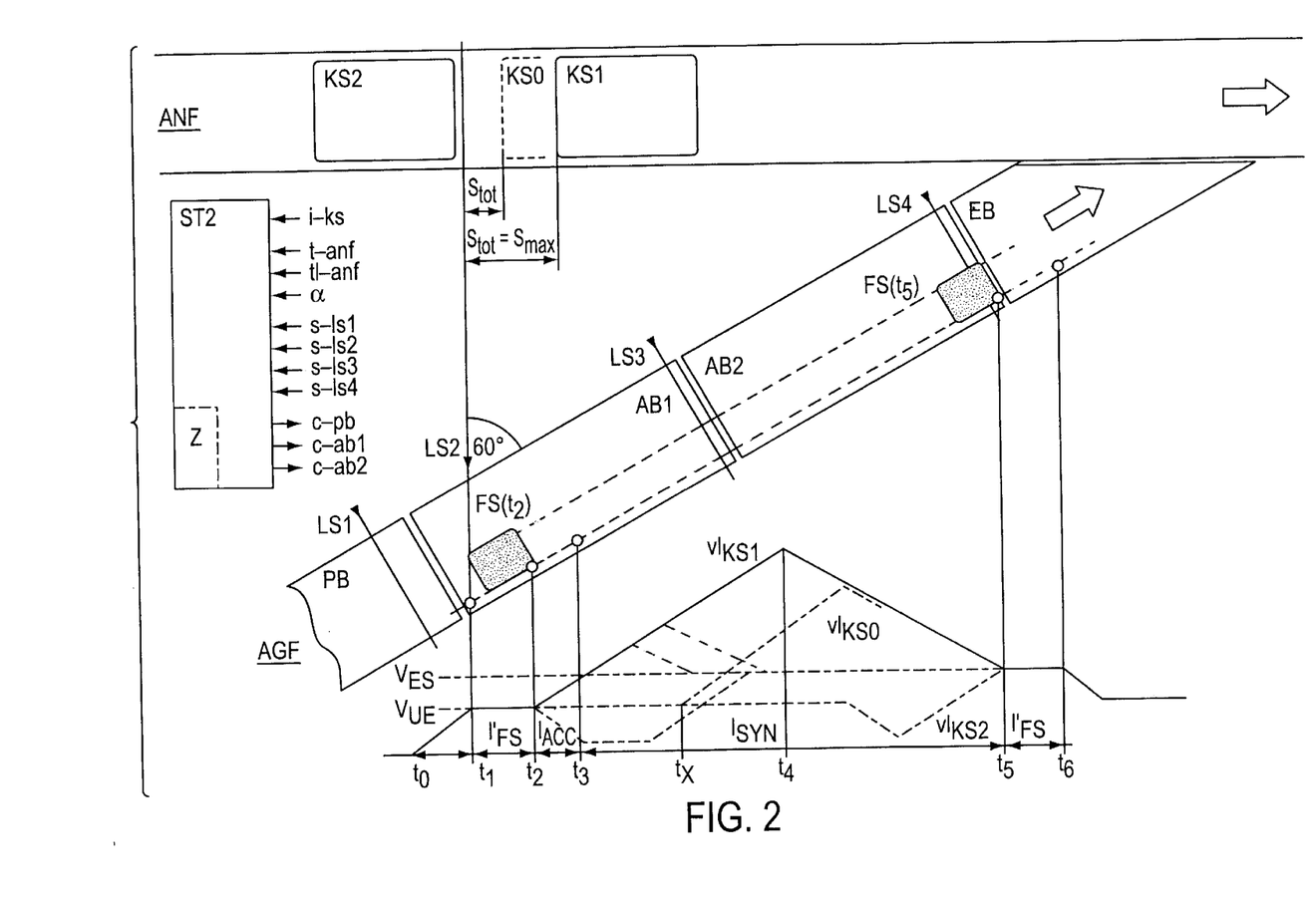
FIG. 2 shows a device according to FIG. 1 with a delivery conveyor provided with two call-up conveyors.

According to the invention, without stopping the parcel FS, a check is performed at a specific time (t2), in order to determine for how long the parcel FS is to be accelerated along a calculated distance of synchronization $I_{syn}$ on the call-up conveyor AB, so that the next empty tipping tray KS can still be reached. Further, it is preferably checked whether the parcel FS can still be positioned at the front edge, in the center or only at the rear edge of the tipping tray KS. The acceleration process takes place on the call-up conveyor AB after the length has been measured. The speed variation of the call-up conveyor AB, as shown in FIGS. 1 and 2 in a diagram, is consistent with the speed of the conveyed parcel FS, so long said parcel is located on the call-up conveyor AB.

In order to perform the necessary calculations, the information i-ks with respect to the existing empty tipping trays, information t-anf, tl-anf (cycling rate and cycle length) with respect to the speed VANF of the acceptance conveyor ANF, information α with respect to the angle encompassed by the supply conveyor AGF and the acceptance conveyor ANF, as well as information s-is1, s-is2, s-is3 with respect to the position of the parcel FS to be channeled, is to be transmitted to the control unit ST1. The information s-is1, s-is2, s-is3 concerning the position of the parcel FS to be channeled is to be transmitted by three light barriers LS1, LS2 and LS3 to the control unit ST1. The calculations described in the following refer to the position of a parcel FS at the light barrier LS2. The first light barrier LS1 is positioned at the end of the buffer conveyor PB and so located orthogonally to the running direction of said conveyor that the parceled good FS, which are stopped at the light barrier LS1, at the beginning of the channeling process can be accelerated to the speed $v_{UE}$ of the call-up conveyor AB prior to being transferred to the call-up conveyor. The second light barrier LS2 which is provided to measure the length of the parceled goods FS and are provided as a starting point for the acceleration process, is orthogonally arranged at the acceptance conveyor ANF, in order to compensate, as described in the above, deviations of the parceled goods FS from the center line of the call-up conveyor or the delivery conveyor AGF.

The calculations described in the following, therefore, can be performed irrespective of lateral displacement of a parcel FS on the delivery conveyor AGF.

The control unit ST1 (also applies to FIG. 2, ST2) is provided with a counting device for calculating and controlling the delivery conveyor AGF or the corresponding conveyors (buffer conveyor PB, call-up conveyor AB (AB1, AB2), while the channeling conveyor EB preferably runs at a constant channeling speed $v_{ES}$). During this process, the control unit ST1 transmits control signals c-pb, c-ab (c-ab1, c-ab2) to the delivery conveyor AGF.

In the following, the path $I_{syn}$ on the call-up conveyor AB is determined which is available for synchronization of the parceled goods FS.

The length of the parceled goods FS is measured in that the time is measured during which the parcel FS passes through the light barrier LS2 at the take over speed $v_{UE}$. (The edges pass through diagonally to each other.) FIG. 1 shows that after measuring the length, the parcel FS conveyed on the left edge of the delivery conveyor AGF already traveled a distance $b_{AB}{}^* \tan \alpha$ on the call-up conveyor AB ($b_{AB}$=width of the call-up conveyor AB). This section can no longer be used for synchronizing the parcel FS with a tipping tray KS, which is to be performed on the call-up conveyor AB.

Further, the section $I_{syn}$ available for synchronization is reduced by the section $I_{acc}$ through which the parcel FS must pass (during the time $t_{acc}$). Due to the difference in speed $v_{UE}$ and $v_{ES}$, as well as a given, preferably constant selected acceleration a, the distance of acceleration $I_{acc}$ can be calculated:

$$I_{acc}=(v_{ES}^2-v_{UE}^2)/2*a$$

The time $t_{acc}$ required for the acceleration process is:

$$t_{acc}=(v_{ES}-v_{UE})/a$$

In addition, the distance of synchronization is reduced by approximately the length $l'_{FS}$ of the measured parcel FS, as said parcel is to be conveyed at the channeling speed $v_{ES}$ when reaching the channeling conveyor EB.

Upon closer consideration, it can be determined that the measured length $l'_{FS}$ of the parcel FS can be reduced by the value $b_{FS}{}^*\tan \alpha$ ($b_{FS}$ is the width of the parcel FS), as the measured value with similar length of the parcel increases in proportion to the width $b_{FS}$ of the parcel FS in the direction of conveyance. With the given minimum width $b_{FS}$ of the parcel FS, the measured length $l'_{FS}$ thus can be optimized in a first approximation. In order to create a safety margin, this correction value, however, is not deducted. As an alternative, the length of the parcel can also be measured by means of the first light barrier LS1 which is located orthogonally to the buffer conveyor PB. This would result in measuring $l'_{FS}$ of the parceled goods FS independent of their width $b_{FS}$.

The length $I_{AB}$ of the call-up conveyor AB, reduced by the path ($b_{AB}{}^*\tan \alpha$), the distance of acceleration $I_{acc}$ and the length $l'_{FS}$ of the parcel FS thus results in the length $I_{syn}$ of the distance of synchronization:

$$I_{syn}=I_{AB}-b_{AB}*\tan \alpha-I_{acc}-l'_{FS}$$

The object of the synchronization process is that, in terms of the direction of the acceptance conveyor ANF, upon completion of synchronization (time t5) a reserved tipping tray KS is at the same level and moves at the same speed $V_{ANF}$. The channeling $V_{ES}$ of the delivery conveyor AGF thus is selected as a function as a function of the angle $\alpha$ which is encompassed by the conveying devices ANF and AGF:

$$V_{ES}=V_{ANF}/\cos \alpha$$

During the calculation of the synchronization process it must also be taken into consideration that the tipping tray KS was conveyed by the distance $S_K$, while the parcel FS was accelerated within the section $I_{acc}$ during the time $t_{acc}$:

$$S_K=V_{ANF}*t_{acc}$$

Within the distance of synchronization $I_{syn}$, the parcel FS must additionally make up the difference between the distances or differential distances $S_{diff}$ which the tipping tray KS and the parcel FS traveled within the time $t_{acc}$ in the direction of the acceptance conveyor ANF:

$$S_{diff}=S_K-\cos \alpha*I_{acc}$$

The time $t_{syn}$ (time t3 to t5) available for synchronization can be calculated by establishing how long it takes for a tipping tray KS to travel the length $I_{syn}$ corresponding to the distance of synchronization along the acceptance conveyor ANF:

$$t_{syn}=\cos \alpha I_{syn}/V_{ANF}$$

The distance at which a parcel FS can catch up with a tipping tray at a constant acceleration within the time $t^{syn}$, is calculated in that the time $t_{syn}$ is subdivided into equally long phases of positive and negative acceleration (times t3 to t4 or t4 to t5) (acceleration of channeling speed $v_{ES}$ to maximum speed at the transfer point (Phase 1) and back to the channeling speed $v_{ES}$ (Phase 2). For this reason the caught-up distance for the first phase is calculated and multiplied by two. The distance $S_{auf}$ caught up in the time $t_{syn}$ is converted in the direction of the acceptance conveyor ANF and therefore is:

$$S_{auf}=\cos \alpha*a*(t_{syn}/2)^2$$

After measuring the length and prior to starting the acceleration phase, a parcel FS, however, can only completely catch up with a tipping tray KS in terms of distance $S_{tot}$ within the distance of acceleration $I_{acc}$ and the distance of synchronization $I_{syn}$:

$$S_{tot}=S_{auf}-S_{diff}$$

Due to a variation of the length $I_{syn}$ of the distance of synchronization or the time of synchronization $t_{syn}$, the catching up distance or the distance $S_{tot}$ to be caught up can be set randomly. With a constant acceleration a over the entire length $I_{syn}$ of the distance of synchronization, the distance $S_{tot}=S_{max}$ can be caught up.

In FIG. 2, the tipping tray KS1 moves ahead of a parcel FS by the maximum distance $S_{max}$ and, therefore, can still be reached at a constant acceleration a (positioning of the rear edge). FIG. 2 further shows the speed variation vIKS1 of the call-up conveyor AB1; AB2 or the parcel FS during the channeling process towards the tipping tray KS1. A tipping tray KS, which runs farther ahead than the distance $S_{max}$, can no longer be reached by the parcel, even with a constant acceleration a. FIG. 2 also shows the speed variation $vI_{KSO}$ of the parcel FS in the course of channeling on a tipping tray KSO which runs ahead less than the distance $S_{max}$. In order to catch up this tipping tray KSO, the parcel FS is accelerated only during a short time $t'_{SYN}$ which is selected in such a way that the caught-up distance $S_{tot}$:

$$S_{tot}=\cos \alpha*a*(t'_{SYN}/2)^2-S_{diff}$$

is consistent with the distance between the tipping tray KSO and the parcel FS (again in reference to the direction of the acceptance conveyor ANF). Due to the variation of the time of synchronization $t'_{SYN}$, the acceleration a can be maintained constant, thus enabling a simple technical implementation. The acceleration of the parcel thus starts at the time t2 and ends at the time t5. The acceleration phase, however, may also start at a later time tx if said phase can be completed by time t5. The first variant is preferred if, when using several call-up conveyors AB1, AB2, the first call-up conveyor AB1 is to be cleared as soon as possible. At the same time, one must take into consideration that the maximum time of synchronization $t_{syn}$ depends on the length $l_{FS}$ of the parceled goods FS and thus changes in any case from one channeling process to another. In principle, however, devices with variable acceleration may be used.

In the event that a parcel FS must wait for a longer period on a tipping tray KS, it is advantageous if the channeling process is not interrupted. In FIG. 2, the tipping tray KS follows a parcel FS and can only be reached (preferable positioning at the front edge) if the parcel FS is delayed. FIG. 2 shows the corresponding speed variation $vl_{KS2}$ of the call-up conveyors AB1, AB2, or the parcel FS as they are being channeled on to the tipping tray KS2.

By using two call-up conveyors AB1, AB2, the channeling process can be made more flexible; for example, the first call-up conveyor AB1 can be set to transfer speed $v_{UE}$ if the parcel FS is still conveyed on the second call-up conveyor AB2 at channeling speed $v_{ES}$. For this purpose, light barriers LS3 or LS3, LS4 are preferably provided which transmit to the control unit ST1, ST2 a corresponding message, as soon as the parcel FS has left the respective conveyor AB or AB1 or AB2.

In the above sections, care was taken for the purpose of synchronization that the distance between the parcel FS and a free tipping tray KS is caught up and balanced. This, however, can also be achieved by determining how long it takes until the tipping tray KS arrives at the point at which the synchronization process is concluded (FIG. 2, time t5). This time $t_{KS}$ thus is exactly consistent with the time which passes between times t2 and t5:

$$t_{KS}=t_{acc}+t_{syn}$$

After the length has been measured, the parcel FS to be channeled, therefore, is to be accelerated and decelerated until, after the speed variation $t_{KS}$=the distances $t_{acc}+t_{syn}$ and the channeling conveyor is reached as a result of which the tipping tray KS is synchronized.

In EP A 0 305 755, a counting device is controlled by means of two light barriers intersecting at a specific angle, which produces a count as a function of the position of the parceled goods when passing through the light barriers, said result being effected by a proportional delay $t_{DEL}$ of the otherwise static channeling process. The light barrier (LS2) provided at the beginning of the call-up conveyor (AB; AB1) may thus also be provided vertically to the delivery conveyor (AGF) when using this measuring device. In this case, the distance of synchronization has the length $l_{syn}$:

$$l_{syn}=l_{AB}-l_{ACC}-l'_{FS}$$

The delay $t_{DEL}$ is taken into consideration by a corresponding shortening of the time of synchronization $t_{syn}$. For the sake of simplicity, it can be assumed that the next free tipping tray KS is provided with a temporal distance $t_{KS}+t_{DEL}$. The time of synchronization $t_{syn}$, therefore, must be calculated as follows:

$$t_{syn}=t_{KS}-t_{acc}+t_{DEL}$$

The inventive method thus can also be used with known devices for channeling parceled goods.

What is claimed is:

1. A process for controlling a channeling of parceled goods, comprising:
   disposing a parcel acceptance conveyor along a first path, said parcel acceptance conveyor moving at a given speed;
   communicating the given speed of the acceptance conveyor to a control unit;
   determining the position of a free space which will receive the parcel and communicating the position to the control unit;
   conveying a parcel along a second path, the second path intersecting the first path at an angle, the conveying taking place by way of a delivery conveyor which moves the parcel to a first transfer point, at least one call-up conveyor which further moves the parcel to a second transfer point, and a channeling conveyor which moves the parcel to the parcel acceptance conveyor;
   determining the position of the parcel which has stopped on the delivery conveyor and communicating the position to a control unit;
   determining a speed of the at least one call-up conveyor and communicating the speed to the control unit;
   measuring a length of a parcel to be channeled as the parcel is moved on the at least one call-up conveyor and communicating the length to the control unit;
   determining a length of time t2 utilized in measuring the length of the parcel with the control unit;
   determining a speed of the channeling conveyor to which the parcel will be transferred and communicating the speed to the control unit;
   calculating the acceleration and deceleration gradient for the at least one call-up conveyor prior to a transfer of the parcel to the channeling conveyor with the control unit;
   synchronizing a movement of the parcel to the free space by controlling the previously calculated acceleration and deceleration gradient of the at least one call-up conveyor carrying the parcel with the control unit;
   transferring the parcel from the at least one call-up conveyor to the channeling conveyor which is moving at a constant speed, the transferring occurring at the speed of the channeling conveyor; and
   synchronously transferring the parcel to the free space on the acceptance conveyor.

2. The process of claim 1, further comprising:
   determining the distance on the at least one call-up conveyor on which the parcel can be accelerated prior to transfer to the channeling conveyor, the determining being based upon the measured length of the parcel, a total length of the at least one call-up conveyor, and at least approximately a distance which the parcel has traveled on the at least one call-up conveyor during time t2.

3. The process of claim 1, further comprising:
   conveying a plurality of containers or tipping trays for receiving the parcel on the acceptance conveyor,
   wherein the synchronous movement of the parcel is synchronized with a front edge of a next empty container or tipping tray, and
   wherein, when a synchronization time is insufficient to synchronize the movement of the parcel to the front edge of the next empty container or tipping tray, the synchronous movement of the parcel is synchronized with a rear edge of the next empty container or tipping tray.

4. The process of claim 3, wherein, when a synchronization time is insufficient to synchronize the movement of the parcel to the next empty container or tipping tray, the synchronous movement of the parcel is synchronized with a subsequent empty container or tipping tray positioned upstream, relative to an acceptance conveyor direction, from the next empty container or tipping tray.

5. The process of claim 1, further comprising:
performing a synchronization calculation not later than at time t2, at which time the parcel has passed through a light barrier, the light barrier being one of:
positioned at a beginning of the at least one call-up conveyor and arranged perpendicularly to the acceptance conveyor; and
positioned at a beginning of the at least one call-up conveyor and arranged perpendicularly to the delivery conveyor;
measuring a lateral deviation of the parcel; and
including a corresponding delay in the synchronization calculation in accordance with the measured lateral deviation.

6. The process according to claim 1, wherein the measuring of the length of the parcel is performed by a control device having a counting device and one of a light barrier arranged perpendicularly to the acceptance conveyor and a light barrier arranged perpendicular to the buffer conveyor.

7. The process according to claim 1, further comprising:
balancing the process with a cycle of the acceptance conveyor and a unit interval per cycle of the acceptance conveyor.

8. The process of claim 1, wherein the parcel acceptance conveyor is moving at a constant speed.

9. The process of claim 1, further comprising:
accelerating the parcel on the delivery conveyor to the speed of the at least one call-up conveyor, via control signals from the control unit to the delivery conveyor, prior to transferring the parcel to the at least one call-up conveyor.

10. The process of claim 9, wherein the accelerating occurs after the determining a speed of the at least one call-up conveyor.

11. The process of claim 9, wherein the accelerating comprises accelerating the parcel on the delivery conveyor with nearly constant acceleration and deceleration to the speed of the at least one call-up conveyor.

12. The process of claim 1, wherein the parcel is in continuous motion from the point where it enters the at least one call-up conveyor to the point where it is loaded onto the free space.

13. A process for controlling a channeling of parceled goods, comprising:
disposing a parcel acceptance conveyor along a first path, said parcel acceptance conveyor moving at a constant speed;
communicating the speed of the acceptance conveyor to a control unit;
determining the position of an empty tipping tray which will receive the parcel and communicating the position to the control unit;
conveying a parcel along a second path, the second path intersecting the first path at an angle, the conveying taking place by way of a delivery conveyor which moves the parcel to a first transfer point, at least one call-up conveyor which further moves the parcel to a second transfer point, and a channeling conveyor which moves the parcel to the parcel acceptance conveyor;
determining the position of the parcel which has stopped on the delivery conveyor and communicating the position to a control unit;
determining a speed of the at least one call-up conveyor and communicating the speed to the control unit;
accelerating the parcel on the delivery conveyor to the speed of the at least one call-up conveyor, via control signals from the control unit to the delivery conveyor, prior to transferring the parcel to the call-up conveyor;
measuring a length of a parcel to be channeled as the parcel is moved on the at least one call-up conveyor and communicating the length to the control unit;
determining a length of time t2 utilized in measuring the length of the parcel with the control unit;
determining a speed of the channeling conveyor to which the parcel will be transferred and communicating the speed to the control unit;
calculating the acceleration and deceleration gradient for the at least one call-up conveyor prior to a transfer of the parcel to the channeling conveyor with the control unit;
synchronizing a movement of the parcel to the empty tipping tray by controlling the previously calculated acceleration and deceleration gradient of the at least one call-up conveyor carrying the parcel with the control unit;
transferring the parcel from the at least one call-up conveyor to the channeling conveyor which is moving at a constant speed, the transferring occurring at the speed of the channeling conveyor; and
synchronously transferring the parcel to the empty tipping tray on the acceptance conveyor,
wherein the parcel is in continuous motion from the point where it enters the call-up conveyor to the point where it is loaded onto the tipping tray.

14. The apparatus of claim 13, wherein the calculating comprises calculating how much to constantly accelerate and constantly decelerate the at least one call-up conveyor prior to a transfer of the parcel to the channeling conveyor with the control unit.

15. A process for controlling a channeling of parceled goods, comprising:
disposing a parcel acceptance conveyor along a first path, said parcel acceptance conveyor moving at a constant speed;
communicating the speed of the acceptance conveyor to a control unit;
determining the position of a free space which will receive the parcel and communicating the position to the control unit;
conveying a parcel along a second path, the second path intersecting the first path at an angle, the conveying taking place by way of a delivery conveyor which moves the parcel to a first transfer point, at least one call-up conveyor which further moves the parcel to a second transfer point, and a channeling conveyor which moves the parcel to the parcel acceptance conveyor;
determining the position of the parcel which has stopped on the delivery conveyor and communicating the position to a control unit;
determining a speed of the at least one call-up conveyor and communicating the speed to the control unit;
accelerating the parcel on the delivery conveyor to the speed of the at least one call-up conveyor, via control signals from the control unit to the delivery conveyor, prior to transferring the parcel to the at least one call-up conveyor;

measuring a length of a parcel to be channeled as the parcel is moved on the at least one call-up conveyor and communicating the length to the control unit;

determining a length of time t2 utilized in measuring the length of the parcel with the control unit;

determining a speed of the channeling conveyor to which the parcel will be transferred and communicating the speed to the control unit;

calculating the acceleration and deceleration gradient for the at least one call-up conveyor prior to a transfer of the parcel to the channeling conveyor with the control unit;

synchronizing a movement of the parcel to the free space by controlling the previously calculated acceleration and deceleration gradient of the at least one call-up conveyor carrying the parcel with the control unit;

transferring the parcel from the at least one call-up conveyor to the channeling conveyor which is moving at a constant speed, the transferring occurring at the speed of the channeling conveyor; and synchronously transferring the parcel to the free space on the acceptance conveyor, wherein the parcel is in continuous motion from the point where it enters the at least one call-up conveyor to the point where it is loaded onto the free space.

16. The apparatus of claim 15, wherein the calculating comprises calculating how much to constantly accelerate and constantly decelerate the at least one call-up conveyor prior to a transfer of the parcel to the channeling conveyor with the control unit.

17. An apparatus for controlling a channeling of parceled goods, comprising:

a parcel acceptance conveyor disposed along a first path, said parcel acceptance conveyor moving at a speed, the speed of the acceptance conveyor being communicated to a control unit;

the apparatus determining a position of the free space which will receive the parcel and communicating the position to the control unit;

a second path for conveying a parcel, the second path intersecting the first path at an angle, the conveying taking place by way of a delivery conveyor which moves the parcel to a first transfer point, at least one call-up conveyor which further moves the parcel to a second transfer point, and a channeling conveyor which moves the parcel to the parcel acceptance conveyor;

a device for determining the position of the parcel which has stopped on the delivery conveyor and communicating the position to the control unit;

a device for determining a speed of the at least one call-up conveyor and communicating the speed to the control unit;

a device for measuring a length of a parcel to be channeled as the parcel is moved on the at least one call-up conveyor and communicating the length to the control unit, a length of time t2 utilized in measuring the length of the parcel being determined with the control unit;

a device for determining a speed of the channeling conveyor to which the parcel will be transferred and communicating the speed to the control unit;

the control unit calculating the acceleration and deceleration gradient for the at least one call-up conveyor prior to a transfer of the parcel to the channeling conveyor; and the control unit synchronizing a movement of the parcel to the free space by controlling the previously calculated acceleration and deceleration of the at least one call-up conveyor carrying the parcel, wherein the parcel is transferred from the at least one call-up conveyor to the channeling conveyor which is moving at a constant speed, the transferring occurring at the speed of the channeling conveyor; and wherein the parcel is synchronously transferred to the free space on the acceptance conveyor.

18. The apparatus of claim 17, further comprising:

a first light barrier arranged perpendicularly to the buffer conveyor; and a second light barrier arranged perpendicularly to the acceptance conveyor;

wherein one of the first and the second light barrier is utilized to measure the length of the parcel, and wherein the second light barrier is utilized for determining the time t2 at which the synchronization process begins.

19. The apparatus of claim 17, further comprising:

a first light barrier arranged perpendicularly to the buffer conveyor;

a second light barrier arranged perpendicularly to the delivery conveyor; and a device for measuring a lateral deviation of the parcel on the delivery conveyor, wherein the control device includes a device for causing a delay corresponding to the lateral deviation of the parcel on the delivery conveyor when calculating the synchronization process.

20. The apparatus of claim 17, wherein the control unit is adapted to control the call-up conveyor and the buffer conveyor.

21. The apparatus of claim 17, wherein the at least one call-up conveyor comprises two separate controllable call-up conveyors with light barriers being located at the ends of the two separate controllable call-up conveyors which are coupled to the control unit.

22. The apparatus of claim 17, wherein the acceptance conveyor comprises at least one container or tipping tray disposed thereon for accepting the parcel to be transferred from the delivery conveyor, wherein a front edge of a next container or tipping tray is a target of the synchronized movement of the parcel, and wherein, when insufficient time remains to synchronize the movement of the parcel to the front edge of the next container or tipping tray, one of the rear end and the center of the next container or tipping tray is the target of the synchronized movement of the parcel.

23. The apparatus of claim 17, further comprising:

a device for determining the distance on the at least one call-up conveyor on which the parcel can be accelerated prior to transfer to the channeling conveyor, the determining being based upon the measured length of the parcel, a total length of the at least one call-up conveyor, and at least approximately a distance which the parcel has traveled on the at least one call-up conveyor during time t2.

24. The apparatus of claim 17, wherein the control unit performs a synchronization calculation not later than at time t2, at which time the parcel has passed through a light barrier, the light barrier being one of:

positioned at a beginning of the at least one call-up conveyor and arranged perpendicularly to the acceptance conveyor; and positioned at a beginning of the at least one call-up conveyor and arranged perpendicularly to the delivery conveyor;

measuring a lateral deviation of the parcel; and including a corresponding delay in the synchronization calculation in accordance with the measured lateral deviation.

25. The apparatus of claim 17, wherein the parcel acceptance conveyor is moving at a constant speed.

26. The apparatus of claim 17, wherein the control unit is adapted to accelerate the parcel on the delivery conveyor to the speed of the at least one call-up conveyor, via control signals from the control unit to the delivery conveyor, prior to transferring the parcel to the at least one call-up conveyor.

27. The apparatus of claim 26, wherein the accelerating occurs after the determining a speed of the at least one call-up conveyor.

28. The apparatus of claim 26, wherein the accelerating comprises accelerating the parcel on the delivery conveyor with nearly constant acceleration and deceleration to the speed of the at least one call-up conveyor.

29. The apparatus of claim 17, wherein the parcel is in continuous motion from the point where it enters the at least one call-up conveyor to the point where it is loaded onto the free space.

* * * * *